Aug. 26, 1930.  E. HARRIS  1,774,177
CALCULATING DEVICE
Filed Aug. 26, 1927
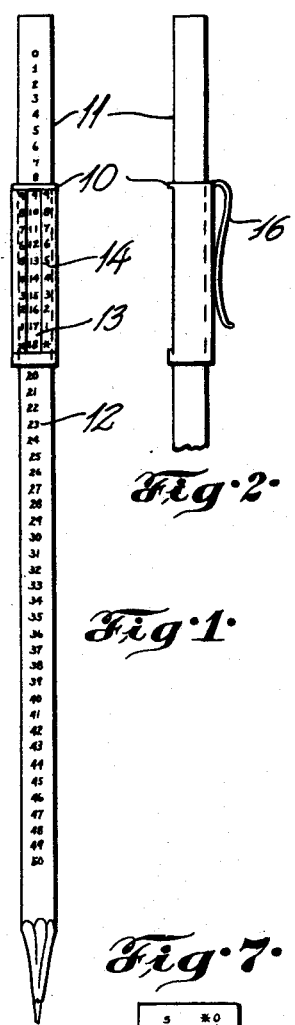
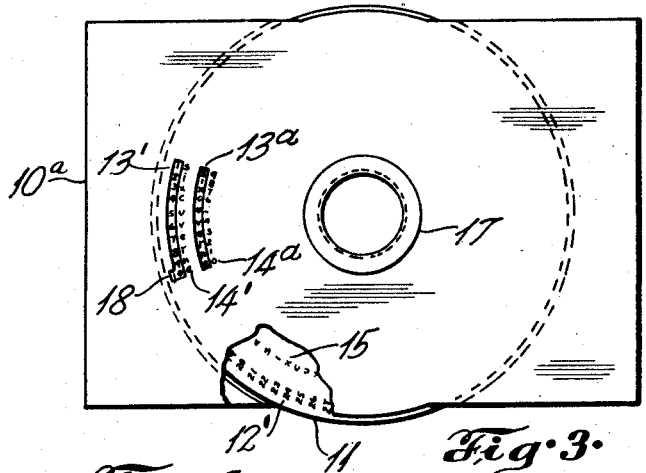
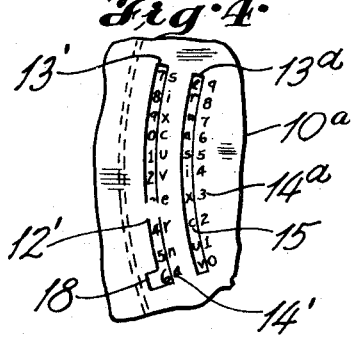
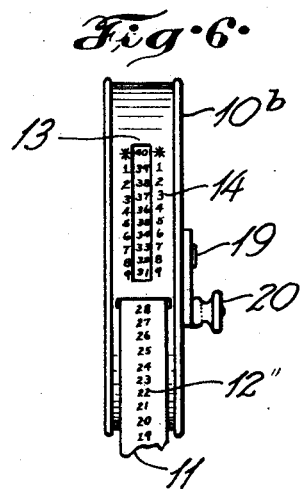
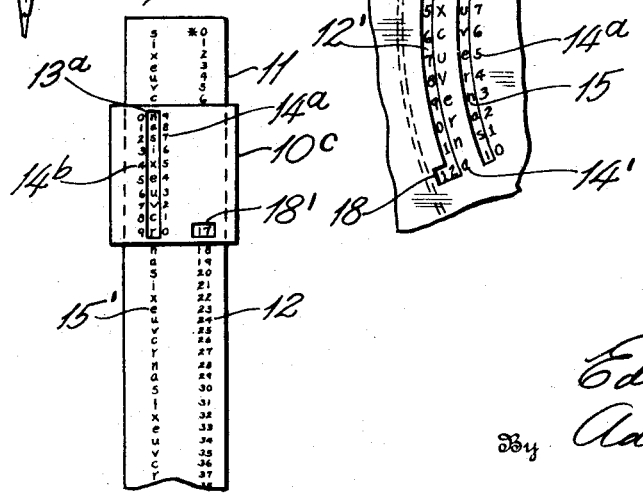
Inventor
Edwin Harris
By Adam E. Fisher
Attorney Patented Aug. 26, 1930

1,774,177

UNITED STATES PATENT OFFICE

EDWIN HARRIS, OF ATHENS, TEXAS

CALCULATING DEVICE

Application filed August 26, 1927. Serial No. 215,581.

This invention relates to calculating devices, and more particularly to such devices adapted for use in performing mathematical operations involving addition and subtraction, and has for one object to provide a neat and convenient article for the purposes intended, which shall be readily and inexpensively manufactured.

Another object is to provide a novelty incorporating means for performing addition and subtraction which may be easily held in the hand of the operator while in use, and which may be provided for use in connection with, or incorporated in, a pencil or penholder, a ruler or tapeline, a blotter or paperweight, or the like, so as to form a desirable and effective advertising novelty.

Specifically, my invention is designed to provide a scale element, either linear or circular, carrying a consecutive numerical scale and a repetitive scale continuing the length of the scale element, (or the perimeter therof, if circular). A frame, movable relatively to the scale element, and embracing the same, has windows associated with said scales and each of said windows has a width equal to the width of the digits of its respective scale, said window being enlarged at one end so as to provide an index window adapted to disclose one of the units of the respective scales. A row of figures is provided on the frame adjacent to the windows row of figures the said numerical and repetitive scales.

With the above and other objects in view, my invention consists in the combination and arrangement of parts hereinafter described and claimed, and more particularly illustrated in the accompanying drawings, wherein Figure 1 is a view of my invention in connection with a pencil or the like;

Figure 2 is a fragmentary side view of Figure 1;

Figure 3 is a view of my invention in connection with a desk pad or blotter or the like;

Figure 4 is an enlarged fragmentary view of Figure 3;

Figure 5 is a view similar to Figure 4;

Figure 6 is a view of my invention in connection with a tape and case therefor; and Figure 7 is a modified form of my invention adapted to be carried in the vest pocket.

Referring now more particularly to the drawings, wherein the same reference numerals refer to like parts thoughout the several drawings, I show a frame 10, and a scale element 11 movably mounted in the frame and embraced thereby, said scale element 11 having a repetitive scale 12 thereon, said frame having a window 13 associated with the scale 12, and said frame 10 also having a row of figures 14 adjacent to said window 13 and associated with the scale 12. If desired, a numerical scale 15 may be placed on the scale element 11, adjacent to the scale 12.

Referring to Figures 1 and 2, I show a scale element 11 having a scale 12 thereon, said scale in this case being a consecutive numerical scale, beginning with 0 and continuing as far as may be desired, although in the embodiment shown this scale runs to 50. The scale element 11 is cylindrical in shape and is movably mounted in the cylindrical frame 10, which has a window 13 associated with the scale 12, and also has rows of figures forming scales 14 adjacent to and on each side of the window and associated with the scale 12, the window 13 being in length equal to the scale 14. The scale 14 in the embodiment shown is a consecutive numerical scale, beginning with 0 (indicated by an asterisk in the drawing) and continuing to 9, said scale 14 running in a direction opposite to the scale 12 on the scale element 11. As shown in the drawing, the embodiment described may be used in connection with a pencil, but it is also adapted for use with a pen-holder, fountain pen, or like device, in all of which cases the frame 10 may be provided with a clip 16 for holding the article in the pocket.

Referring to Figures 3, 4 and 5, I show a scale element 11 having a pair of radially adjacent scales 12', 15 thereon, one of said scales, as 12', being a consecutive numerical scale and the other, as 15, being a repetitive scale, the scale element 11 in this modification being circular or disk-like in shape, and the scales 12' and 15 being spaced from each other and circumferentially disposed on the element 11 and spaced from the perimeter thereof. In the embodiment shown, the consecutive numerical scale 12' runs from 0 to 99, and the repetitive scale 15 consists of a repeated group of ten arbitrarily selected letters, or symbols, each letter being radially alined with one of the units of the numerical scale. The scale element 11 is movably mounted in the frame 10ª, as by a ferrule 17 passed through said frame and through the axis of the disc-like scale element 11, whereby the said element 11 may be rotated in the frame 10ª, and the pair of scales 12', 15, on the element 11 may be thus moved relatively to the windows 13', 13ª, in the frame 10ª, respectively associated with the said scales 12', 15; the said frame 10ª also has rows of characters comprising scales 14', 14ª adjacent to the respective windows 13', 13ª, the characters of said rows 14', 14ª, being radially aligned and respectively associated with the scales 12', 15. In the embodiment shown, the scale 14' consists of one group of the ten arbitrarily selected letters or symbols, the same being associated with the numerical units of the scale 12'; and the scale 14ª consists of a group of ten consecutive digits running from 0 to 9, inclusive, and associated with the letters or symbols of the scale 15. The consecutive digits of the scale 14ª run in a direction opposite to the units of the numerical scale 12'. One end of the window 13' is enlarged to form an index window 18, which discloses one unit of the scale 12'. The construction described may be employed in connection with a blotter, or a paper weight, or a like article.

In Figure 6 is shown another modified form of Figure 1, wherein the frame 10ᵇ is circular in shape, and the scale element 11 is composed of flexible material, as a tape, which may be wound on a shaft 19 journaled in the frame 10, and operable by a handle 20. By this means the extent of the scale 12 may be considerably increased, thus providing greater usefulness to the device.

In Figure 7 is shown a modied form of Figure 3, the scale element 11 being tape-like in shape, and slidable through the frame. The tape-like scale element 11 is provided with alined scales 12, 15', the scale 12 being as heretofore described, and the scale 15' being a repetitive scale consisting of a group of arbitrarily selected letters; a window 13ª is provided in the frame 10ᶜ, associated with the scale 15', and an index window 18' is provided in the said frame associated with the scale 12; the said frame also has the scales 14ª, 14ᵇ adjacent to the said window 13ª, and associated with the scale 15', one scale, as 14ª, being on one side of said window, and the other scale, as 14ᵇ, being on the other side of the window. The scale 14ª runs from 0 to 9 and the scale 14ᵇ is similar to the scale 14ª, but runs in an opposite direction. The index window 18' is positioned opposite the "0" mark of the scale 14ª, and consequently is opposite the "9" mark of the scale 14ᵇ, and discloses one unit of the scale 12.

It will be readily seen that the form shown in Figure 7, for example, may be employed also in the specific constructions shown in Figures 1, 3, and 6, and likewise, the form shown in Figure 1 may be employed in the constructions shown in Figures 3 and 7, and also the form shown in Figure 3 may be employed in the construction shown in Figures 1, 6 and 7.

In use, referring to Figures 1 and 6, the scale element 11 being in any intentional position relatively to the frame 10, or 10ᵇ, the "0" mark on the scale 14 on the frame is indicated by an asterisk, and the number on the scale 12 on the scale element 11 opposite the asterisk is the starting point at the inception or the "answer" at the completion, of an operation. Thus, in Figure 1, if it is desired to add "9" to "18", the scale element 11 is moved relatively to the frame 10 until "18" on the scale 12 of the scale element 11 is opposite the number "9" on the scale 14, so that the scale 12 has been moved nine units from its starting point, and the number "27" will now be opposite the asterisk on the scale 14. From this description, it will be readily seen that in Figure 1 is shown the result of adding "9" plus "9", the answer "18", being the figure on the scale 12 opposite the asterisk on the scale 14. The construction shown in Figure 6 is used in a similar manner.

Referring now to Figure 3, and more particularly to Figures 4 and 5, which show enlarged fragmentary views of Figure 3, there are two methods of operating this form of my invention, as follows:

First method: Referring to Figure 4, the starting point is always one of the "0" digits of the numerical scale 12', whichever one may appear in the window 13', and which in this case is opposite the letter or symbol "c" of the scale 14. The "answer" is always shown in the index window 18. If it be now desired to add "6" to the number shown in the index window, which in this case is also "6", the scale element 11 is moved so as to increase the value of the number shown in the index window, which would be clockwise in this case, until the digit "6" on the scale 12' is oppositely of the letter "c" on the scale 14; the answer, "12", will appear in the index window, as shown in Figure 5.

The second method in connection with Figure 3 may also be employed in connection with the construction shown in Figure 7, and is as follows:

The starting point is always the "0" mark of the scale 14ª, and the answer is shown in the index window 18. Thus in Figure 4, if it is desired to add "6" to the figure shown in the index window, it will be seen that the letter "v" of the repetitive scale 15' is opposite the 0 mark on the scale 14ª. To add, this letter "v" is moved relatively to the scale 14ª until opposite the figure "6" on said scale 14ª, whereupon the answer, "12" may be read in the index window 18, as shown in Figure 5. In Figure 7 the repetitive scale 15' is arranged differently from the similar scale 15 shown in Figures 3, 4, and 5, but as these letters are arbitrarily selected, the same may be arranged in any manner at the option of the person constructing the device.

In Figure 7, which for addition is used as above described, a means is shown for performing subtraction, using the scale 14ᵇ. The starting point is the 0 mark of the scale 14ᵇ, and the answer is read in the index window 18', as before described. Thus, in Figure 7, if it be desired to subtract "4" from the figure shown in the index window, in this case "17", it will be observed that the letter "n" of the scale 15' is opposite the "0" mark of the scale 14ᵇ, and the scale element 11 is then moved in a direction to decrease the value of the figure shown in the index window 18' until the said letter "n" is opposite the figure "4" on the scale 14ᵇ, whereupon the answer will appear in the index window.

While I have herein described a certain specific method of constructing and assembling the elements of my invention, it is understood same may be varied in minor details, not departing from the spirit of my invention as defined in the appended claims.

I claim:

1. In a device of the kind described, a frame, and a scale element movable in the frame, said scale element having a pair of assocated scales thereon, one of said scales being a consecutive scale, and the other scale being a repetitive scale, said frame having a window alined with, and exposing ten of the figures of each of said scales.

2. In a device of the kind described, a frame, and a scale element movable in the frame, said scale element having a pair of associated scales thereon, one of said scales being a consecutive scale, and the other scale being a repetitive scale, said frame having a window alined with, and exposing ten of the figures of each of said scales, and a row of figures on said frame adjacent each of said windows and associated with the exposed portions of the respective scales.

In testimony whereof I affix my signature.

EDWIN HARRIS.